(12) United States Patent
Takahashi

(10) Patent No.: US 6,507,447 B1
(45) Date of Patent: Jan. 14, 2003

(54) MAGNETIC INFORMATION STORAGE DEVICE HAVING A HIGH-SENSITIVITY MAGNETIC SENSOR AND A SIGNAL PROCESSING CIRCUIT PROCESSING AN OUTPUT OF THE HIGH-SENSITIVITY MAGNETIC SENSOR

(75) Inventor: Yasuhiko Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 422 days.

(21) Appl. No.: 09/588,444

(22) Filed: Jun. 6, 2000

(30) Foreign Application Priority Data

Sep. 3, 1999 (JP) .............................. 11-250799

(51) Int. Cl.$^7$ .............................. G11B 5/09; G11B 5/02; G11B 21/02

(52) U.S. Cl. .................. 360/46; 360/67; 360/324.1; 360/75

(58) Field of Search ...................... 360/46, 67, 324.1, 360/75

(56) References Cited

U.S. PATENT DOCUMENTS 5,650,887 A * 7/1997 Dovek et al. .................. 360/75
6,392,849 B2 * 5/2002 Maruyama et al. ......... 360/314

* cited by examiner

*Primary Examiner*—Regina N. Holder
(74) *Attorney, Agent, or Firm*—Greer, Burns & Crain, Ltd.

(57) ABSTRACT

A signal processing circuit of a spin-valve magnetic sensor includes a polarity detection circuit for detecting a polarity of an output signal produced by the magnetic sensor and a polarity control unit controlling the polarity of the output signal in response to a result of the polarity detection.

18 Claims, 12 Drawing Sheets

FIG. 1 RELATED ART
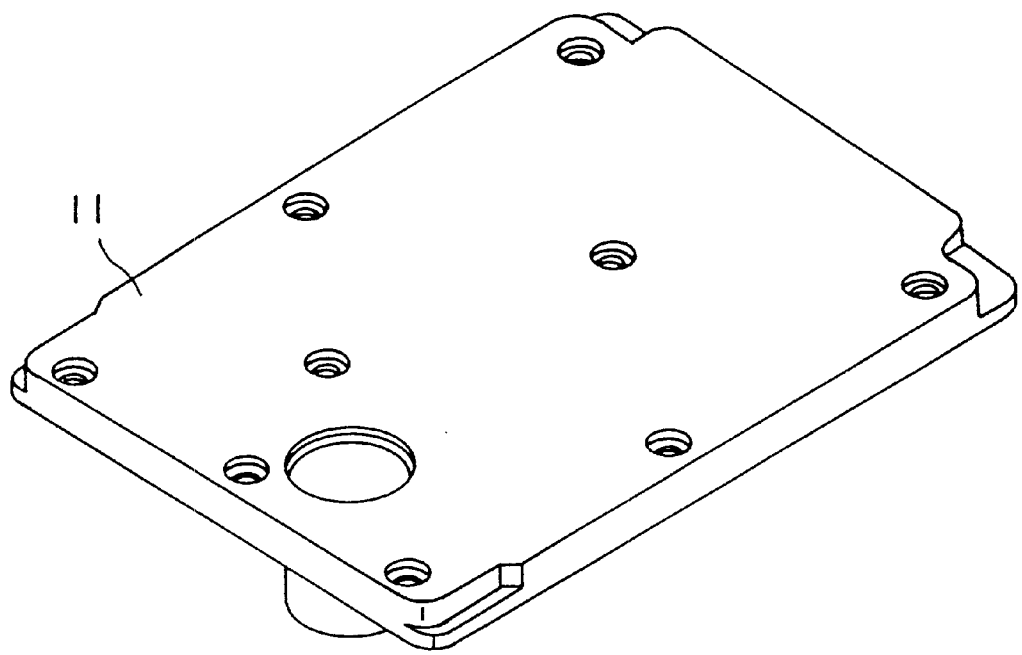
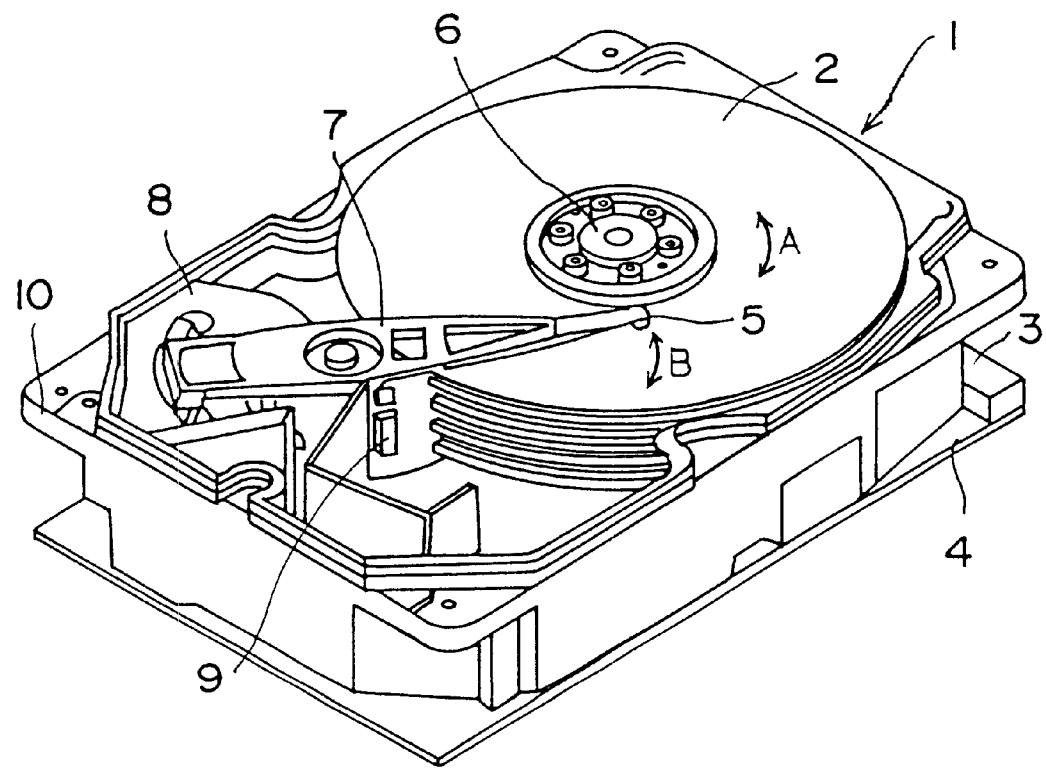

MAGNETIC INFORMATION STORAGE DEVICE HAVING A HIGH-SENSITIVITY MAGNETIC SENSOR AND A SIGNAL PROCESSING CIRCUIT PROCESSING AN OUTPUT OF THE HIGH-SENSITIVITY MAGNETIC SENSOR

CROSS-REFERENCE TO RELATED APPLICATION

The present application is based on Japanese priority application No. 11-250799 filed on Sep. 3, 1999, the entire contents of which are hereby incorporated by reference.

BACKGROUND OF THE INVENTION

The present invention generally relates to storage of information and more particularly to a magnetic storage device having a high-sensitivity magnetic sensor and a signal processing circuit for processing an output of the high-sensitivity magnetic sensor.

With increase of recording density in magnetic storage devices called hard disk drive, recent, leading-edge hard disk drives generally use a GMR (giant magneto-resistive) sensor in a magnetic head for picking up information from a magnetic disk. A GMR magnetic sensor is a device that changes a magneto-resistance thereof in response to an external magnetic field and is able to detect a feeble magnetic field produced by a tiny magnetization spot formed on a magnetic disk.

On the other hand, a GMR magnetic sensor has a drawback in that the magnetic polarization of the magnetic materials used therein easily undergoes reversal. Such a reversal may be caused by an electrostatic discharge and causes an inversion of polarity in the output signal representing the result of the reading operation. Further, such a reversal of the magnetic polarity may induce a distortion in the electric signal produced by the GMR magnetic sensor. When such an inversion of polarity or distortion is caused in the output signal, the desired reproduction of the information signal is not possible or severely impaired.

In view of the foregoing drawback of the GMR magnetic sensors, there is a proposal to use a spin-valve magnetic sensor in a magnetic head for reading the information from the magnetic disk.

FIG. 1 shows an example of a magnetic disk device 1 according to a related art.

Referring to FIG. 1, the magnetic disk drive 1 includes a magnetic disk 2 accommodated in an enclosure 10 having a cover 11 and stores information on the magnetic disk 2 in the form of concentric tracks. The magnetic disk 2 is mounted on a spindle motor 6 for rotation, and a floating magnetic head 5 scans over the surface of the magnetic disk 2. The magnetic head 5 is mounted at an end of a swing arm 7, wherein the arm 7 is connected to a voice coil motor 8 and the voice coil motor 8 actuates the arm 7 for swinging motion. With the swinging motion of the arm 7 thus caused by the voice coil motor 8, the magnetic head 5 scans over the surface of the magnetic disk 2 generally in a radial direction thereof. Thereby, the magnetic head 5 is controlled so as to trace a desired track on the disk 2.

The voice coil motor 8 is supplied with an electric signal from a read/write amplifier 9 for actuating the arm 7, while the read/write amplifier 9 further supplies an electric signal to the magnetic head 5 via the arm 7 for writing or reading of information on or from the magnetic disk 2. Thus, in response to the electric signal, the magnetic head 5 senses, or alternatively induces, a magnetization on the magnetic disk 2 and writing or reading of information is achieved on or from the magnetic disk 2.

It should be noted that the electric signal thus supplied to the magnetic head 5 from the read/write amplifier 9 corresponds to the data created and supplied from a host device (not shown), wherein the host device supplies the data to a circuit substrate 4 of the magnetic disk device 1 via a connector 3, and the electric circuit provided on the circuit substrate 4 converts the data to the electric signal.

In the construction of FIG. 1, it should be noted that the magnetic disk 2, the magnetic head 5, the spindle motor 6, the arm 7, the voice coil motor 8 and the read/write amplifier 9 are accommodated in the enclosure 10 having the cover 11.

FIG. 2 shows the construction of the signal processing system used in the magnetic disk device 1 of FIG. 1 in the form of a block diagram.

Referring to FIG. 2, the processing system is formed on the circuit substrate 4 and includes an HDIC (head IC) unit 13 that amplifies an output signal produced by a GMR magnetic sensor or spin-valve magnetic sensor of the magnetic head 5. The HDIC unit 13 is also called a head amplifier and is provided on the magnetic head 5 together with the GMR or spin-valve magnetic sensor. The output signal of the magnetic sensor 5 is then supplied to an RDC (read channel) unit 14 on the circuit substrate 4 wherein, the RDC unit 14 demodulates the original information recovered from the magnetic disk 2 by the magnetic sensor 5 in an encoded form, by conducting a sampling process.

The information thus demodulated is then supplied to an HDC (hard disk controller) unit 15 on the circuit substrate 4, wherein the HDC unit 15 transmits the information thus demodulated by the RDC unit 14 to a host device via the connector 3 not shown in FIG. 2. Further, the HDC unit 15 recovers the information related to servo control of the magnetic disk 2 or tracking control of the magnetic head 5 from the output of the RDC unit 14 and supplies the same to an MCU (micro-control unit) 16 provided also on the circuit substrate 4. Thereby, the MCU 16 controls the spindle motor 6 and the voice coil motor 8 via a servo control circuit 17 such that the magnetic disk 2 rotates at a predetermined, controlled speed as represented in FIG. 2 by an arrow A.

The MCU 16 further controls the operation of the RDC unit 14. Under control of the MCU 16, the arm 7 is caused to swing as represented in FIG. 2 by an arrow B, and the magnetic head 5 traces a track formed on the magnetic disk 2.

FIG. 3 shows the construction of a spin-valve magnetic sensor 22 provided in the magnetic head 5 for reading the magnetic information from the magnetic disk 2.

Referring to FIG. 3, the spin-valve magnetic sensor 22 is constructed on a substrate 23 of a magnetic material constituting a yoke and includes a free layer 18 typically formed of a ferromagnetic material such as a Ni-Fe alloy, a non-magnetic layer 19 formed on the free layer 18 of a non-magnetic material such as Cu, a pinned layer 20 of a ferromagnetic material such as a Ni-Fe alloy, and a pinning layer 21 of an anti-ferromagnetic material such as an Fe-Mn ordered alloy.

The pinning layer 21 is magnetized in the direction as indicated in FIG. 3 by an arrow P and creates a stable magnetic field associated with the magnetization P, wherein, due to the anti-ferromagnetic nature of the pinning layer 21, the magnetization P does not change easily even when the external magnetic field is changed. Due to the stable magnetic field thus created by the pinning layer 21, the magnetization of the pinned layer 20 is fixed on pinned in the counter direction as represented in FIG. 3 by an arrow Q. On the other hand, the magnetization in the free layer 18, which is separated from the pinned layer 20 by the non-magnetic layer 19, changes the magnetization thereof in response to the external magnetic field created by the magnetization spot formed on the magnetic disk 2, as represented by arrows S and T.

FIG. 4 shows the operation of the spin-valve magnetic sensor 22.

Referring to FIG. 4, it can be seen that the pinned layer 20 is magnetized in the fixed direction represented by the arrow Q, while the magnetization of the free layer changes or rotates in response to the magnetic signal on the magnetic disk 2 as represented by the arrows S and T. Thereby, the angle between the magnetization of the pinned layer 20 and the magnetization in the free layer 18 is changed in response to the magnetic signal on the magnetic disk 2.

FIGS. 5A and 5B show the two operational states of the spin-valve magnetic sensor 22, wherein FIG. 5A shows the case in which the magnetization Q in the pinned layer 20 is anti-parallel with respect to the magnetization S in the free layer 18, while FIG. 5B shows the case in which the magnetization Q is parallel to the magnetization T in the free layer 18.

In the state of FIG. 5A, the electrons in the pinned layer 20 are polarized either to an up-spin state or down-spin state, while the electrons in the free layer 18 are polarized to an opposite spin state. Thereby, there occurs no substantial flow of the electrons from the pinned layer 20 to the free layer 18 across the non-magnetic layer 19 or vice versa, and the electrons experience a scattering. In correspondence to this, the spin-valve magnetic sensor 22 shows a high resistance.

In the state of FIG. 5B, on the other hand, the electrons in the pinned layer 20 and the electrons in the free layer 18 are polarized to the same up-spin state or down-spin state. Thereby, the electrons can flow from the pinned layer 20 to the free layer 18 or vice versa substantially freely and the spin-valve magnetic sensor 22 shows a low resistance.

FIG. 6 shows the resistance of the spin-valve magnetic sensor 22 as a function of the angle formed between the magnetization of the free layer 18 and the pinned layer 20.

As represented in FIG. 6 by a continuous line, the spin-valve magnetic sensor 22 shows a minimum resistance when the magnetization in the free layer 18 and the magnetization in the pinned layer 20 are parallel and a maximum resistance when the magnetization in the free layer 18 and the magnetization in the pinned layer are anti-parallel.

In such a spin-valve magnetic sensor, it is thus essential for the proper operation of the magnetic sensor that the magnetization of the pinned layer 20 is pinned stably. When there occurs a reversal of magnetization in the pinned layer, the output of the magnetic sensor indicative of the resistance of the spin-valve magnetic sensor would be reversed as represented in FIG. 6 by a broken line. When such a reversal is caused, it is therefore no longer possible to restore the information signal from the output of the magnetic sensor 22.

In view of the demand of miniaturization of the magnetic head used in recent magnetic storage devices for high-density recording, there is a demand also for a spin-valve magnetic sensor used therein to decrease the size of the magnetic layers for reducing the inertia of the magnetic head. On the other hand, such a decrease of size of the magnetic layers raises problem in that the effect of the surface magnetization that tends to occur so as to cancel out the magnetization of the magnetic layer is increased. Thereby, the pinned layer easily undergoes unwanted reversal of magnetization and the operation of the spin-valve magnetic sensor becomes inevitably unstable. Such a reversal may be caused by a minute electric current such as an electrostatic discharge.

A similar problem occurs also in a TMR (tunneling-magneto-resistance) magnetic sensor that uses a pinned layer.

SUMMARY OF THE INVENTION

Accordingly, it is a general object of the present invention to provide a novel and useful magnetic information storage device having a high-sensitivity magnetic sensor and a signal processing circuit for processing an output of the high-sensitivity magnetic sensor, wherein the foregoing problems are eliminated.

Another object of the present invention is to provide a signal processing circuit for processing an output of a magnetic sensor such as the one used in a magnetic information storage device wherein reproducing of information signal is achieved properly based on the output of the magnetic sensor even in such a case there occurs a reversal of magnetization in the magnetic layer constituting the magnetic sensor.

Another object of the present invention is to provide a signal processing circuit of a magnetic sensor such as the one for use in a magnetic information storage device, comprising:

a polarity detection unit supplied with an output signal of the magnetic sensor, said polarity detection unit detecting a polarity of said output signal; and a polarity control unit supplied with said output signal of said magnetic sensor, said polarity control unit producing an output signal corresponding to said output signal of said magnetic sensor with a controlled polarity controlled in response to a result of detection of said polarity detection unit.

According to the present invention, it is possible to operate a magnetic information storage device stably even in such a case there occurs a reversal of magnetization in the magnetic layer constituting the magnetic sensor in the magnetic head.

Other objects and further features of the present invention will become apparent from the following detailed description when read in conjunction with the attached drawings.

BRIEF DESCRIPTION OF THE DRAWINGS

FIG. 1 is a diagram showing the construction of a magnetic disk drive of a related art;

DETAILED DESCRIPTION OF THE INVENTION

First Embodiment

Figure 7:
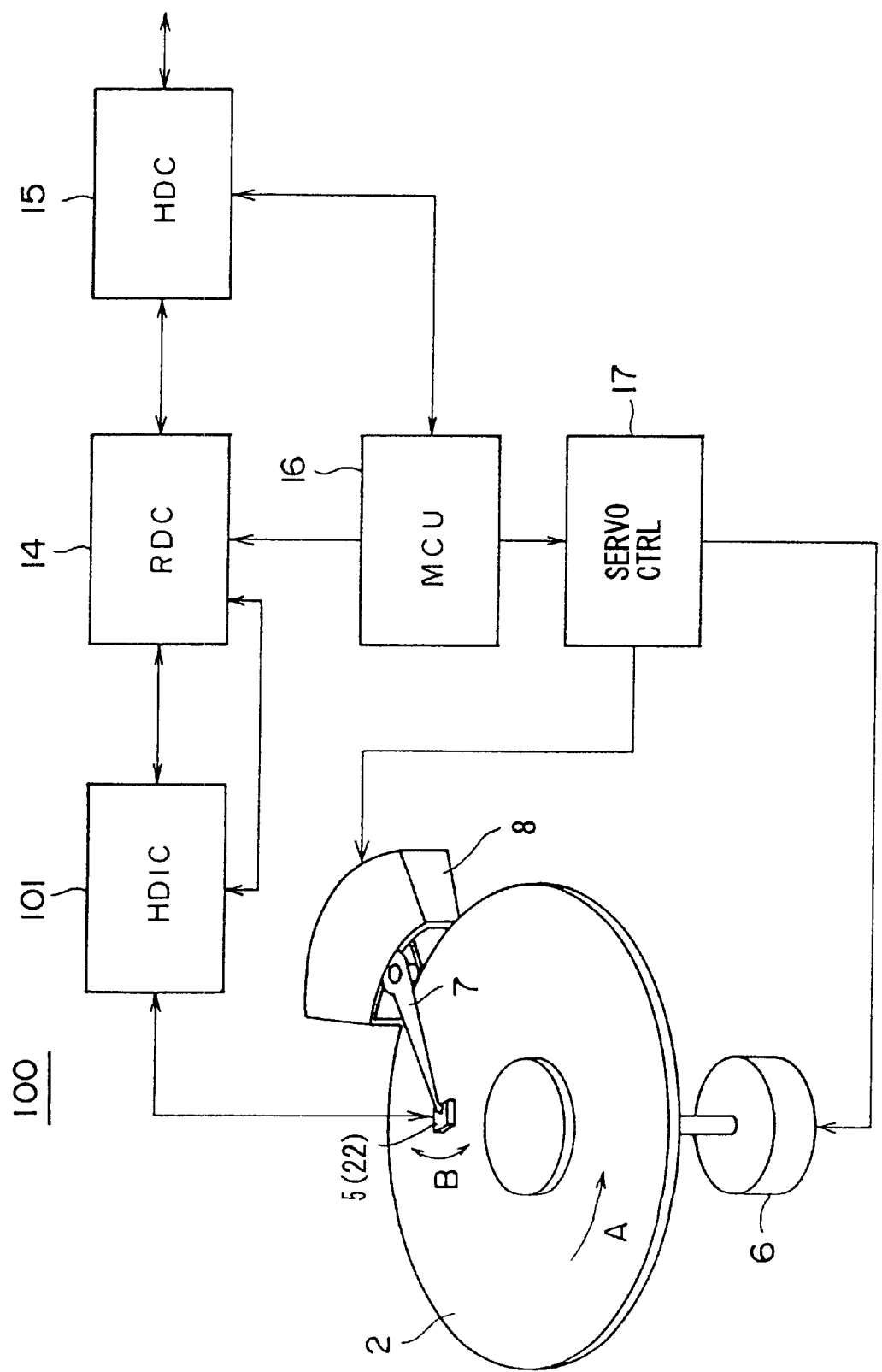
FIG. 7 is a block diagram showing the construction of a signal processing system of a magnetic disk drive according to a first embodiment of the present invention.

FIG. 7 shows the construction of a signal processing circuit 100 cooperating with the magnetic head 5 for processing the output signal of the spin-valve magnetic sensor 22 provided in the magnetic head in a block diagram, wherein those parts corresponding to the parts described previously are designated by the same reference numeral and the description thereof will be omitted.

Figure 2:
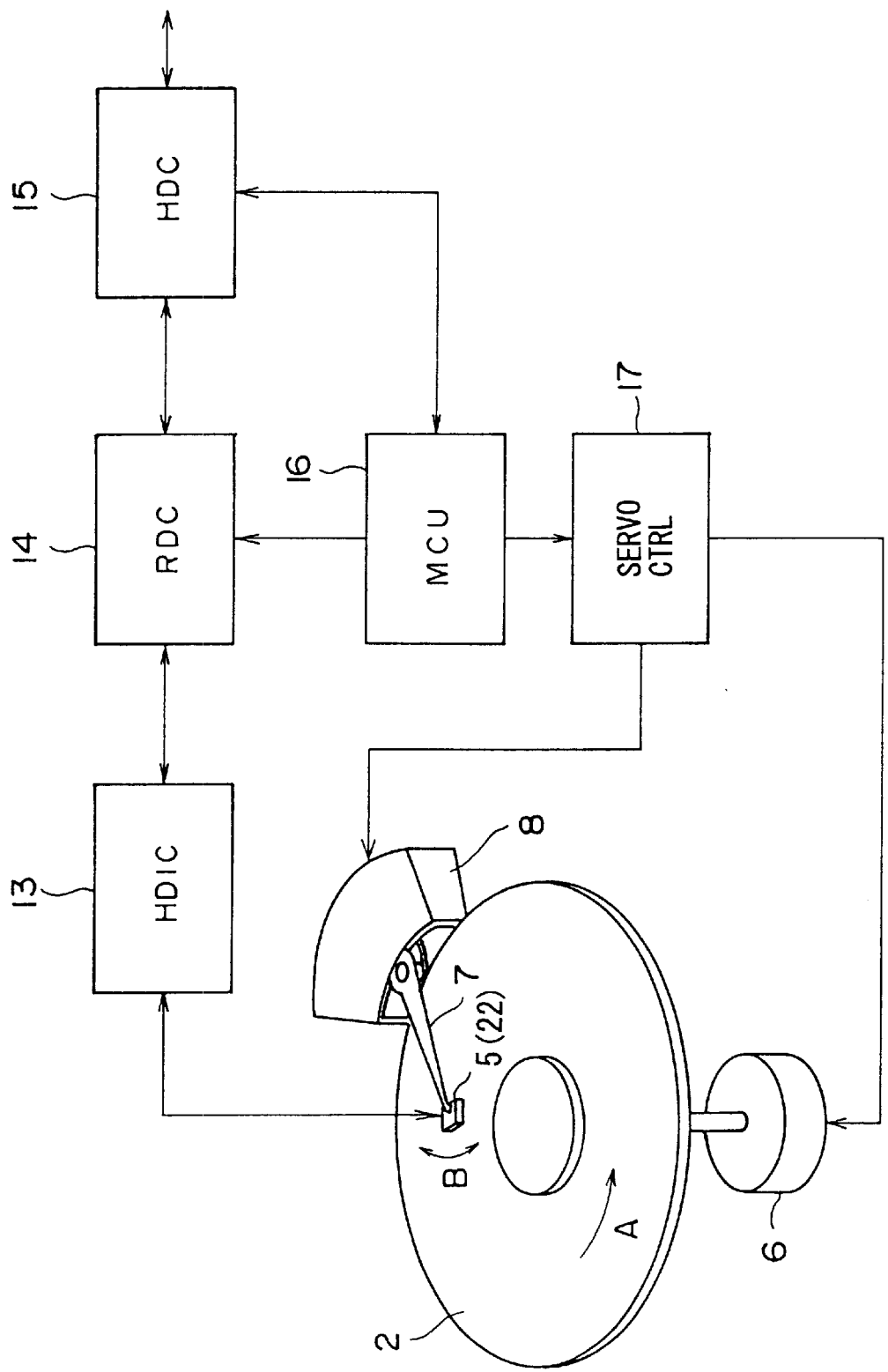
FIG. 2 is a block diagram showing the construction of a signal processing system used in the magnetic disk drive of FIG. 1.
Figure 3:
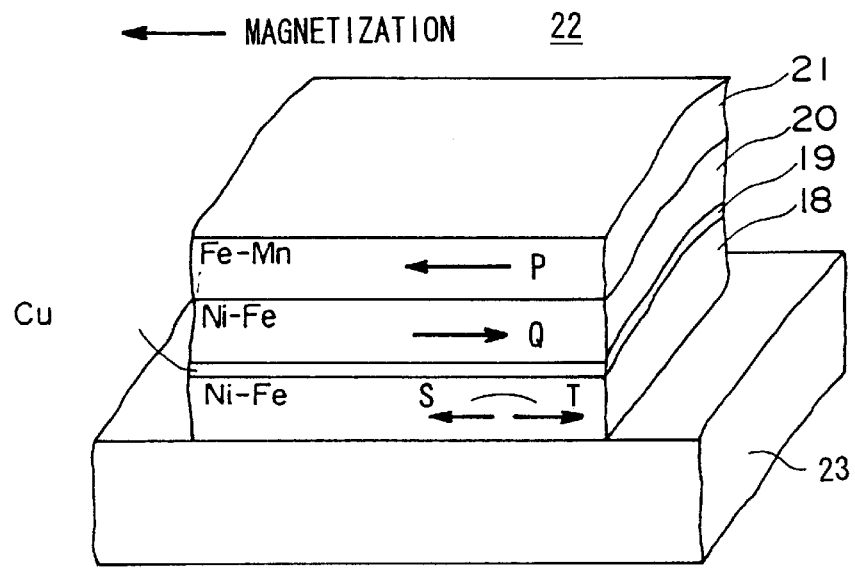
FIG. 3 is a diagram showing the construction of a spin-valve magnetic sensor according to a related art.
Figure 4:
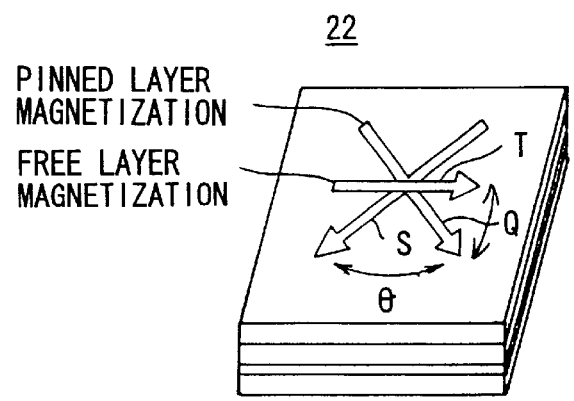
FIG. 4 is a diagram showing the operational principle of the spin-valve magnetic sensor of FIG. 3.
Figure 5:
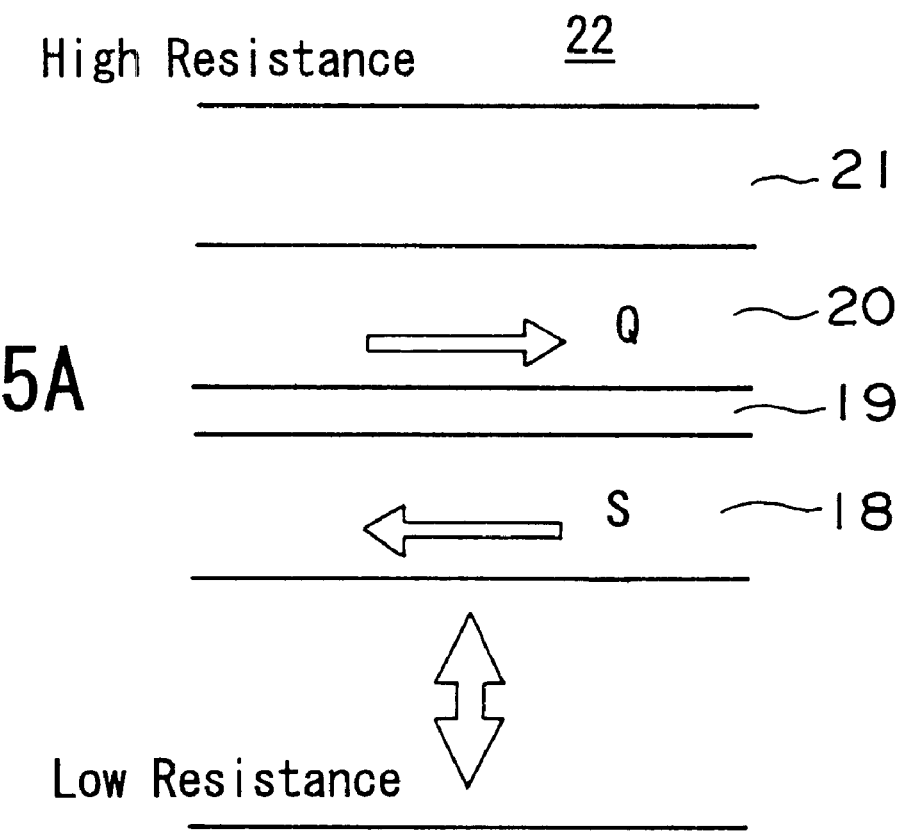
FIGS. 5A and 5B are further diagrams showing the operational principle of the spin-valve magnetic sensor of FIG. 3.
Figure 6:
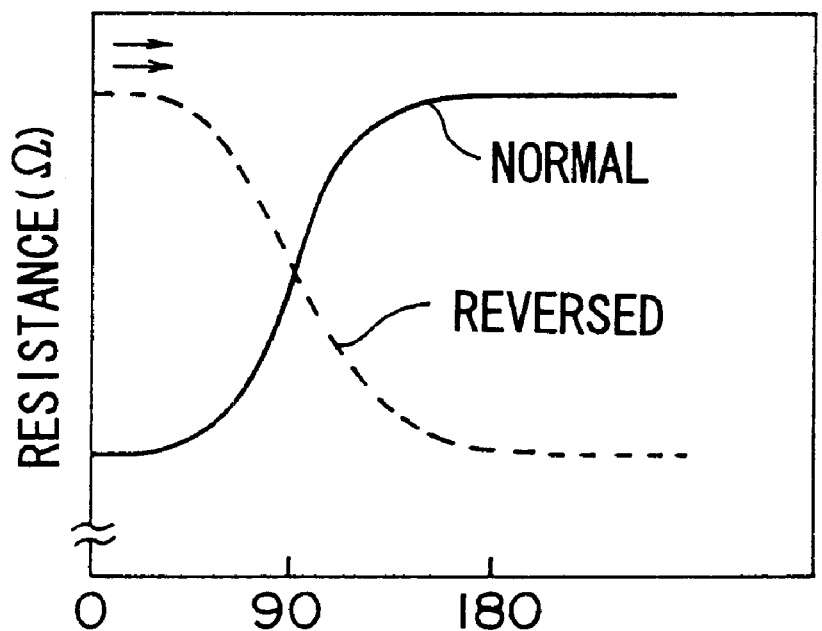
FIG. 6 is a further diagram showing the operational principle of the spin-valve magnetic sensor of FIG. 3.

Referring to FIG. 7, the signal processing circuit 100 includes an HDIC (head IC) unit 101 in place of the HDIC unit 13 of FIG. 2, and the output of the spin-valve magnetic sensor 22 in the magnetic head is supplied to an HDIC unit 101 for processing.

Figure 8:
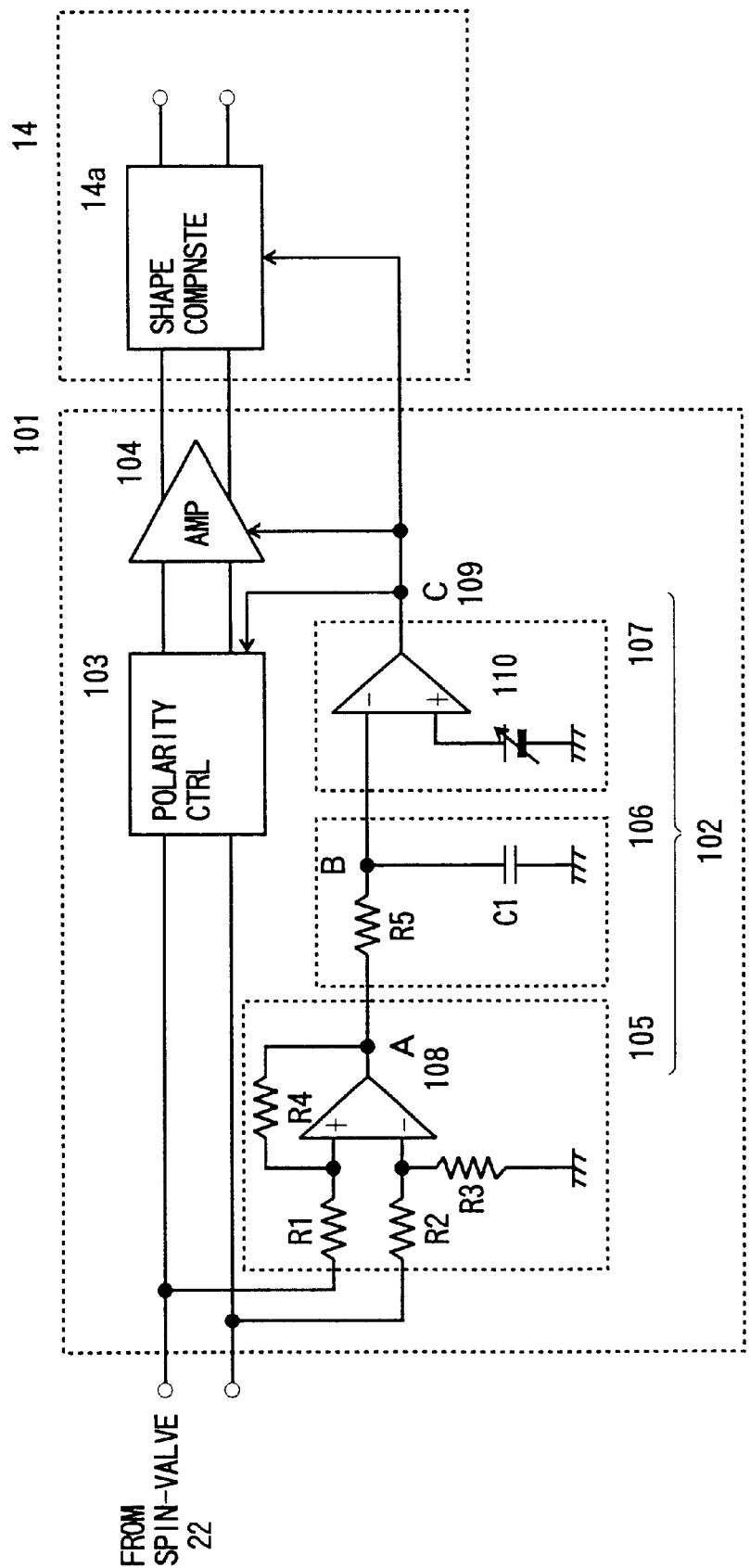
FIG. 8 is a block diagram showing a part of the signal processing system of FIG. 7.

FIG. 8 shows the construction of the HDIC unit 101 in detail.

Referring to FIG. 8, the HDIC unit 101 includes a D.C. cut-off unit 105 supplied with the output signal of the spin-valve magnetic sensor 22, wherein the D.C. cut-off unit 105 includes an operational amplifier 108 constituting a differential amplifier together with resistors R1–R4 and the operational amplifier 108 compares the signal levels at a non-inverting input terminal and an inverting input terminal and cuts off the D.C. component such as a head bias voltage used for driving the magnetic head from the output signal of the spin-valve magnetic sensor 22.

The output signal of the spin-valve magnetic sensor 22 thus processed by the D.C. cut-off unit 106 is then forwarded to a filtering circuit 106 including a resistor R5 and a capacitor C1 wherein the filtering circuit 106 rectifies and produces a smoothed D.C. output indicative of the average level of the output signal of the spin-valve magnetic sensor 22. Thereby, the resistor R5 and the capacitor C1 determine together the interval or duration in which the foregoing averaging process is to be made.

The D.C. output of the filtering circuit 106 is then supplied to a comparison circuit 107 including an operational amplifier 109, wherein the operational amplifier 109 constitutes a comparator together with a reference voltage source 110 and produces an output indicative of whether the foregoing average output of the filtering circuit 106 exceeds the reference voltage produced by the reference voltage source 110.

The output of the comparison circuit 107 is then supplied from an output node C to a polarity control unit 103 to which the output signal of the spin-valve magnetic sensor 22 is supplied.

Figure 9:
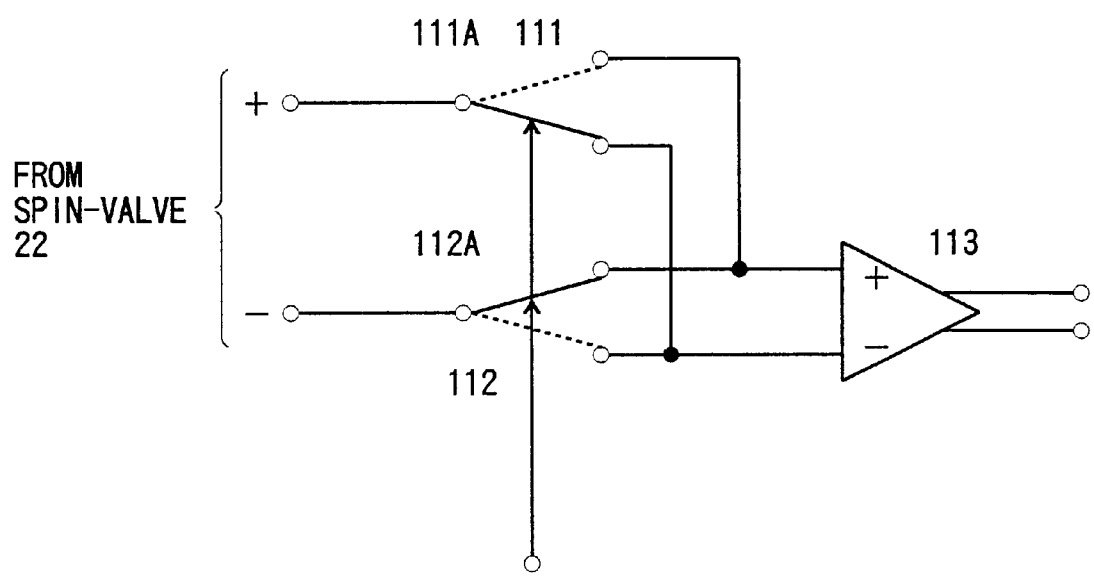
FIG. 9 is a circuit diagram showing a part of the circuit shown in FIG. 8

FIG. 9 shows the construction of the polarity control unit 103 of FIG. 8.

Referring to FIG. 9, the polarity control unit 103 includes first and second conductors 111A and 112A constituting together a bipolar signal path of the output signal of the spin-valve magnetic sensor 22, wherein it can be seen that the first conductor is connected to a first switch 111 controlled by an output of the comparison circuit 107 while the second conductor is connected to a second switch 112 also controlled by an output of the comparison circuit 107.

In the state represented in FIG. 9 by a continuous line, the switches 111 and 112 are controlled such that the signal on the conductor 111A is supplied to an inverting input terminal of an operational amplifier 113 that is provided in the polarity control unit 103 for linear amplification of the output signal of the spin-valve magnetic sensor 22, while the signal on the conductor 112A is supplied to a non-inverting input terminal of the operational amplifier 113. In the state represented by a broken line in FIG. 9, on the other hand, the switches 111 and 112 are controlled such that the signal on the conductor 111A is supplied to the non-inverting input terminal of the operational amplifier 112A and the signal on the conductor 112 is supplied to the inverting input terminal of the operational amplifier 113.

Thus, the polarity of the output signal of the spin-valve magnetic sensor 22 supplied to the polarity control unit 103 is selectively inverted in response to the output of the comparator 109 and the operational amplifier 113 produces the output signal of the spin-valve magnetic sensor 22 thus controlled in phase with a linear signal amplification. Thereby, the D.C. cut-off unit 105, the filtering unit 106 and the comparison circuit 107 constitute a polarity detection unit 102 in the HDIC unit 101.

Referring back to FIG. 8, the output of the polarity control unit 103 is further supplied to an amplifier 104 wherein the amplifier 104 is controlled by the output of the comparison circuit 107 and changes the amplification factor thereof, such that the output signal of the spin-valve magnetic sensor 22 has a predetermined signal amplitude irrespective of the polarity. For example, the amplifier 104 amplifies the output signal of the spin-valve magnetic sensor 22 supplied from the polarity control unit 103 with an increased amplification factor when the comparator 109 produces a high level output and with a reduced amplification factor when the comparator 109 produces a low level output, or vice versa.

The output of the amplifier 104 is supplied to a signal shape compensating circuit 14a provided in the RDC unit 14 on the circuit substrate 4 as the output of the HDIC 101, together with the output of the comparison circuit 107. The RDC unit 14, in turn, compensates for asymmetry of the output signal supplied thereto in response to the output of the comparison circuit 107. For example, the signal shape compensating circuit 14a applies a signal shape compensation process to the output signal of the spin-valve magnetic sensor 22 only when the output of the comparison circuit 107 indicates inversion of polarity in the output signal of the spin valve-magnetic sensor 22, or vice versa. Alternatively, the threshold of the signal shape compensation process conducted in the circuit 14a may be changed in response to the output of the comparison circuit 107.

As a result of the process in the amplifier 104 and in the signal shape compensating circuit 14a conducted in response to the output of the comparison circuit 107, and hence the output of the polarity detection unit 102, a positive or negative signal having the same amplitude and same shape is obtained as the output of the spin-valve magnetic sensor 22. The output of the spin-valve magnetic sensor 22 thus processed is then supplied to the HDC unit 14 for ordinary processing as usually practiced in the art.

Figure 10:
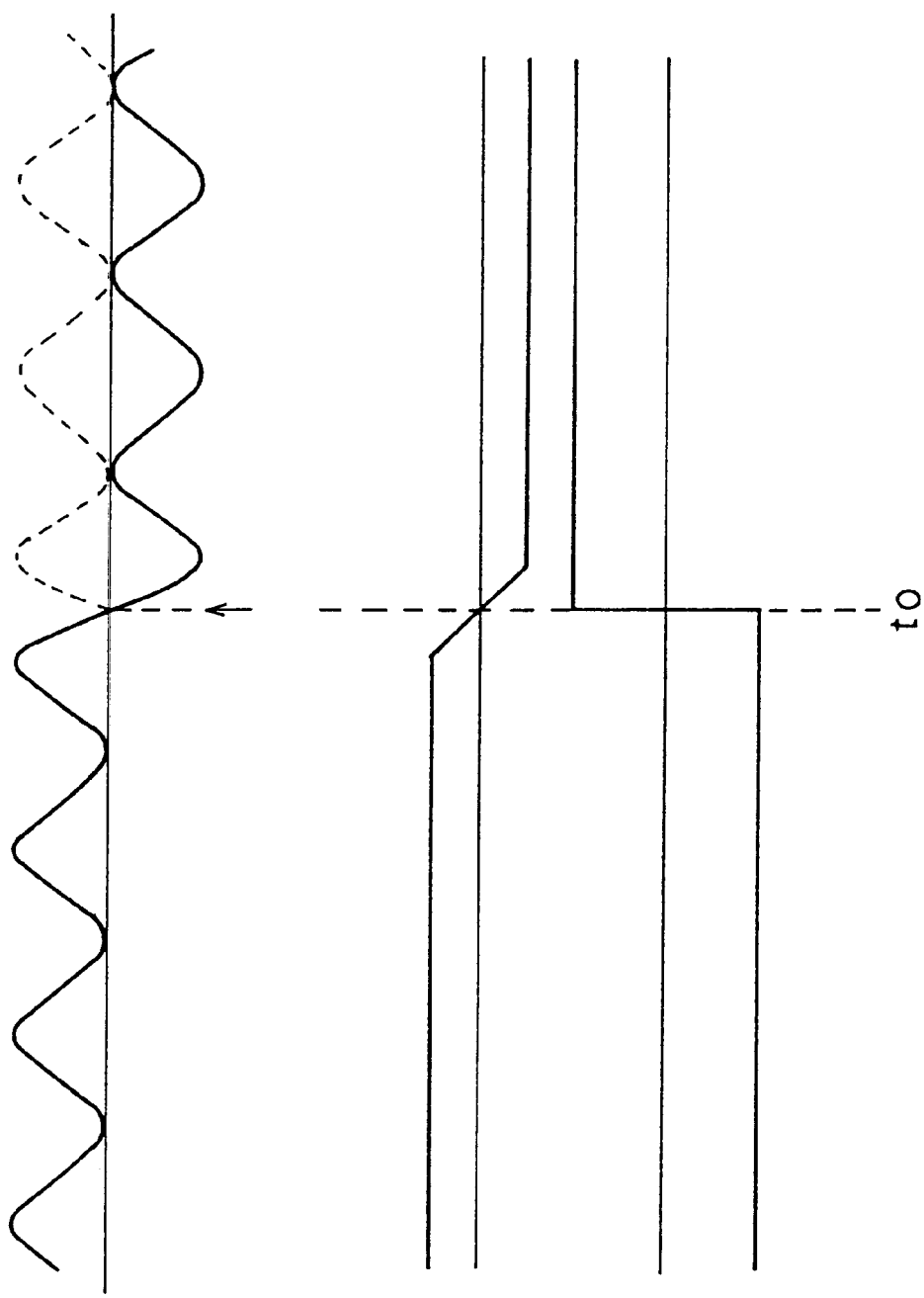
FIGS. 10A–10C are diagrams showing the waveform of various signals appearing in the circuit of FIG. 8.

FIGS. 10A–10C show the waveform of the signals respectively at a node A, a node B and a node C represented in FIG. 8.

Referring to FIG. 10A, the D.C. cut-off unit 105 eliminates a D.C. bias contained in the output signal of the spin-valve magnetic sensor 22 by subtracting the voltage on the inverting input terminal of the differential amplifier 108 from the voltage on the non-inverting input terminal, wherein it can be seen that there occurs a reversal of polarity in the output of the differential amplifier 108 at a timing $t_0$ as a result of reversal of magnetization in the magnetic layer constituting the spin-valve magnetic head 22. As noted before, such a reversal of the magnetization may be caused by various reasons including minute electric current associated with electrostatic discharge. Although not illustrated, the output signal thus reversed in polarity may have a degraded signal waveform of reduced amplitude due to the deviation of the spin-valve magnetic sensor 22 from the optimized state, caused as a result of the reversal of the magnetization.

In response to the inversion of the polarity of the output signal of the spin-valve magnetic sensor 22, it can be seen that the output of the filtering circuit 106 at the node B undergoes a transition from a positive value to a negative value as represented in FIG. 10B, and the output of the polarity detection unit 102 at the node C causes a transition from a low level state to a high level state at the timing to as indicated in FIG. 10C.

Thus, in response to the high-level output of the comparison circuit, the polarity control unit 103 of FIG. 8 restores the original polarity by inverting the polarity of the output signal of FIG. 10A, and the output signal thus processed is further subjected to amplitude compensation and shape compensation respectively in the amplifier 104 and the circuit 14a.

After the foregoing processing, the output signal of the spin-valve magnetic sensor 22 is ready for the demodulation process conducted in the RDC unit 14. Thus, it should be noted that the output signal of the magnetic sensor 22 takes a maximum value when the magnetic field picked up from the magnetic disk 2 is parallel to the predetermined magnetized direction of the pinned layer 20 and a minimum value when the magnetic field is anti-parallel to the foregoing predetermined magnetized direction of the pinned layer 20, even in such a case the actual direction of the magnetization of the pinned layer 20 is accidentally reversed from the foregoing predetermined magnetized direction.

Second Embodiment

Figure 11:
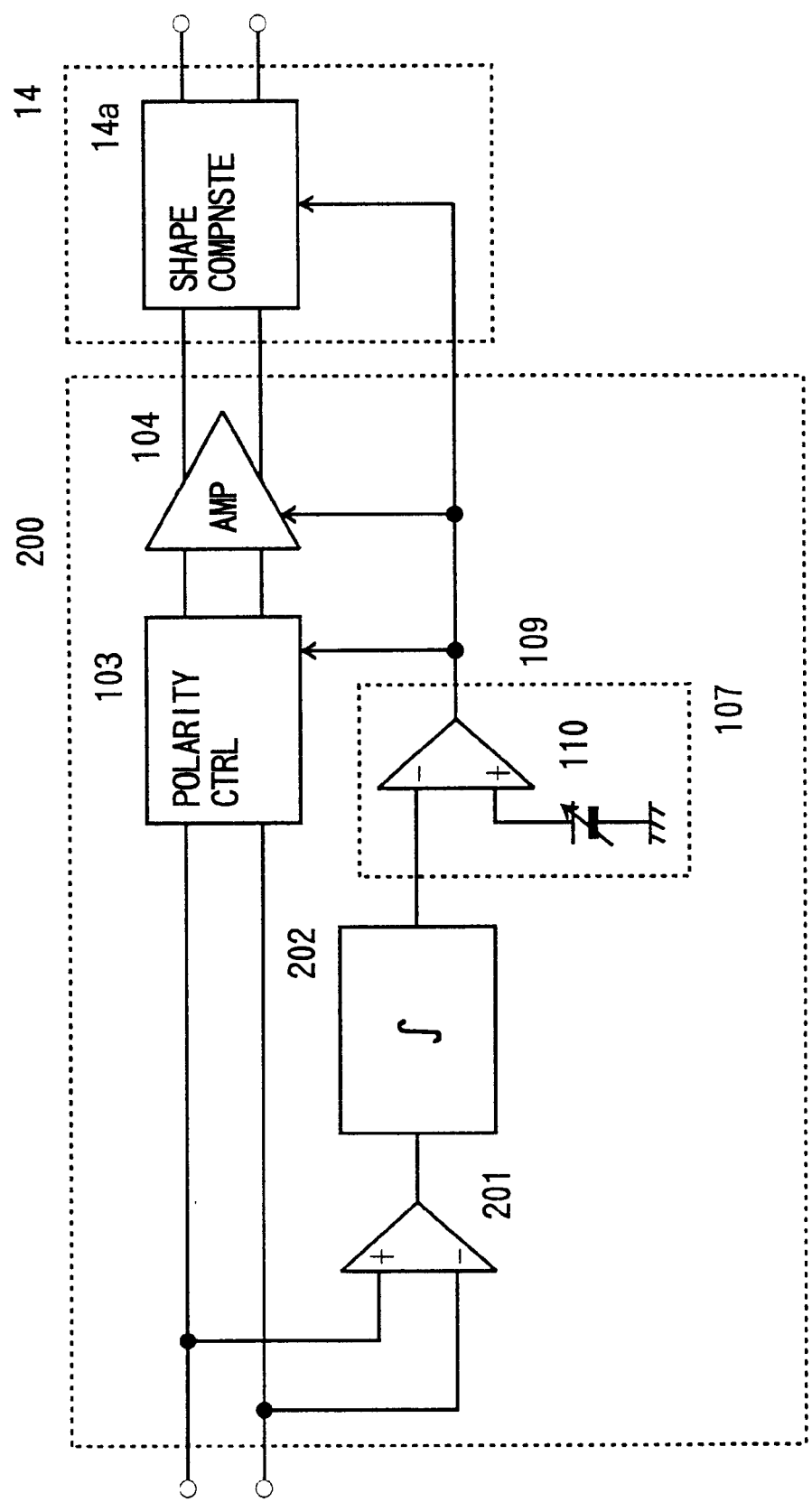
FIG. 11 is a block diagram showing the construction of a signal processing circuit for use in a magnetic disk drive according a second embodiment of the present invention.

FIG. 11 shows the construction of an HDIC unit 200 according to a second embodiment of the present invention in a block diagram, wherein those parts corresponding to the parts described previously are designated by the same reference numerals and the description thereof will be omitted.

Referring to FIG. 11, the HDIC unit 200 uses a differential amplifier 201 for polarization detection and an integration circuit 202 for averaging the output of the spin-valve magnetic sensor 22 by conducting an integration process on the differential signal produced by the differential amplifier 201.

The output of the integration circuit 202 is supplied to an inverting input terminal of the comparator 109.

Otherwise, the construction and operation of the signal processing circuit 100 of the magnetic disk drive is identical with those of the previous embodiment and the description thereof will be omitted.

Third Embodiment

Figure 12:
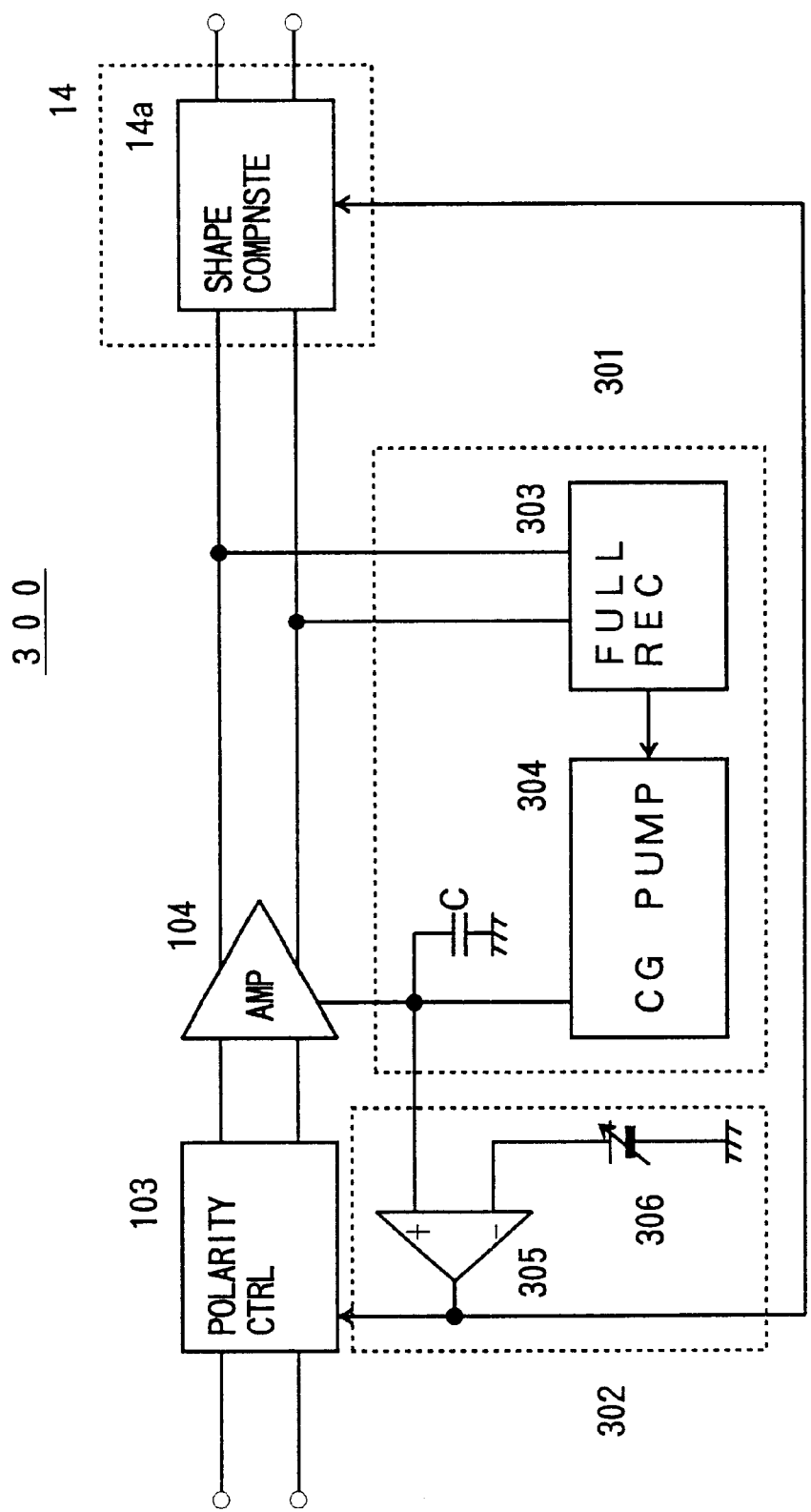
FIG. 12 is a block diagram showing the construction of a signal processing circuit for use in a magnetic disk drive according to a third embodiment of the present invention.

FIG. 12 shows the construction of an HDIC unit 300 according to a third embodiment of the present invention, wherein those parts corresponding to the parts described previously are designated by the same reference numerals and the description thereof will be omitted.

Referring to FIG. 12, the HDIC unit 300 includes an AGC circuit 301 detecting the output of the amplifier 104 for controlling the gain of the amplifier 104 based on the output of the amplifier 104 thus detected. The ACG circuit 301 is used also for detecting the polarity of the output signal of the spin-valve magnetic sensor 22.

More specifically, the reversal of magnetization in the pinned layer 20 of the spin-valve magnetic sensor 22 would cause a reduction of output voltage due to the fact that the state of the magnetic sensor 22 is offset from an optimized state in such a reversed state. Thereby, the AGC circuit 301 detects the polarization inversion associated with such a reversal of the magnetization by detecting the decrease of the output level of the magnetic sensor 22.

Thus, the AGC circuit 301 includes a full-wave rectifier 303 rectifying the output of the amplifier 104 and a charge pump circuit 304 driven by the output of the full-wave rectifier 303, wherein the output of the charge pump 304 is stored in a capacitor C and the amplification factor of the amplifier 104 is controlled by the voltage associated with the electric charges stored in the capacitor C.

It should be noted that the output of the charge pump 304 thus accumulated in the capacitor c is further supplied to a non-inverting input terminal of an operational amplifier 305 having an inverting input terminal connected to a reference voltage source, and the operational amplifier 305 produces an output indicative of inversion of the polarity of the output signal of the spin-valve magnetic sensor 22. Thereby, the output of the operational amplifier 305 is supplied to the polarity control unit 103 and the shape compensating circuit 14a explained already with reference to the previous embodiment for polarity inversion and waveform shaping.

It should be noted that such an AGC circuit 301 may be provided in the HDIC unit 101 or 200 of the previous embodiment so as to control the gain of the amplifier 104 and for detecting the inversion of the polarity of the incoming output signal of the spin-valve magnetic sensor 22.

Fourth Embodiment

Figure 13:
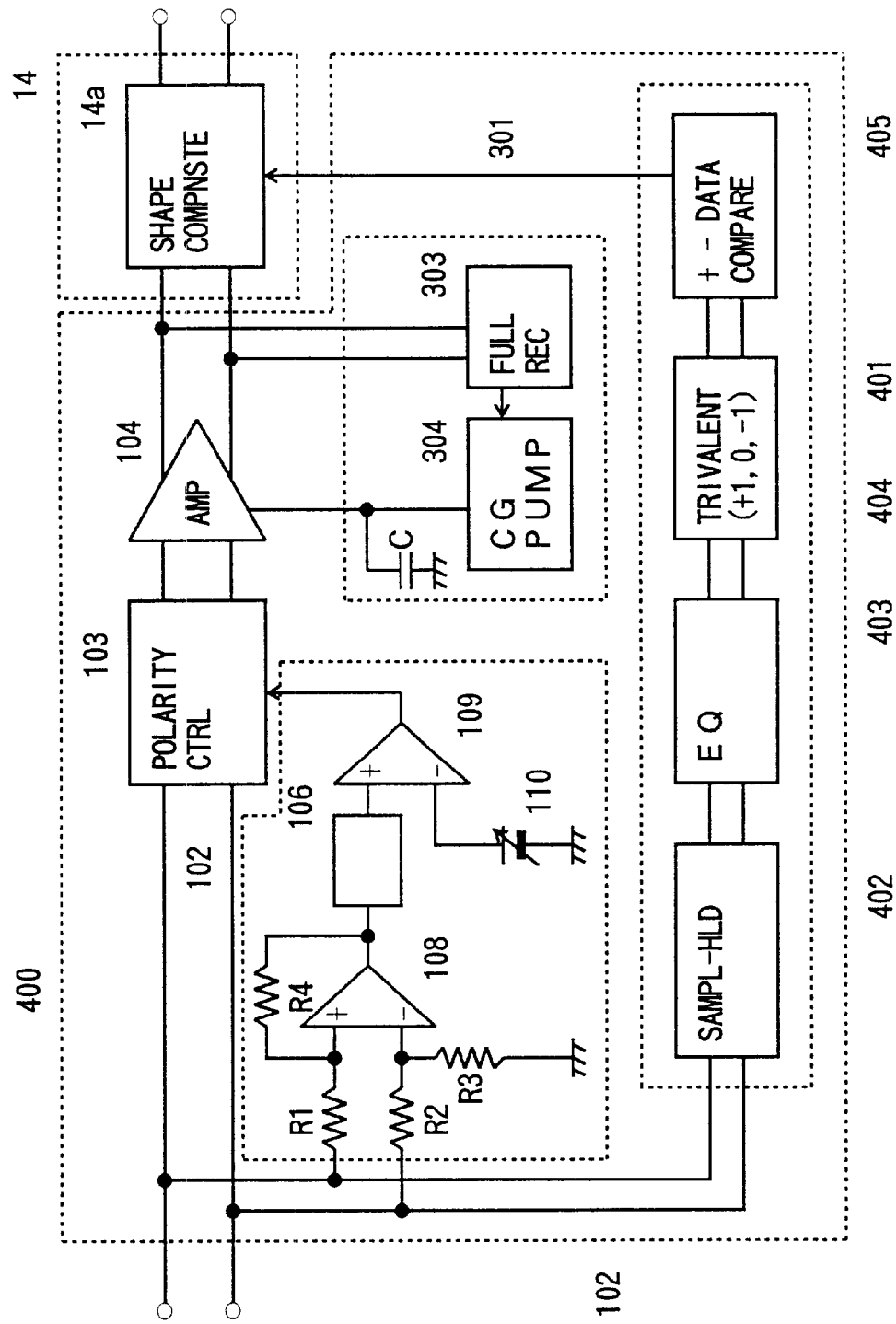
FIG. 13 is a block diagram showing the construction of a signal processing circuit for use in a magnetic disk drive according to a fourth embodiment of the present invention.

FIG. 13 shows the construction of an HDIC unit 400 according to a fourth embodiment of the present invention, wherein those parts corresponding to the parts described previously are designated by the same reference numerals and the description thereof will be omitted.

Referring to FIG. 13, the HDIC unit 400 includes the polarity detection unit 102 described previously with reference to FIG. 8 for detecting the polarity of the output signal of the spin-valve magnetic sensor 22 and the AGC circuit 301 for controlling the gain of the amplifier 104 described previously with reference to FIG. 12. Further, the circuit of FIG. 13 includes a sample-and-hold circuit 402, an equalizer 403, a trivalent discrimination circuit 404 and a data comparison circuit 405, wherein the sample-and-hold circuit 402 samples and holds the output signal of the spin-valve magnetic sensor 22.

Thereby, the sample-and-hold circuit 402 supplies an output signal to the equalizer for equalization, and the output signal of the spin-valve magnetic sensor 22 thus processed by the sample-and-hold circuit 402 and the equalizer 403 is supplied to the trivalent discrimination circuit 404 for discrimination.

More specifically, the trivalent discrimination circuit 404 compares the output signal of the spin-valve magnetic sensor 22 supplied thereto from the equalizer 403 with a threshold value and discriminates whether the output signal has a value "+1" or "–0" or "–1."

The result of discrimination in the circuit 404 is then supplied to the data comparison circuit 405 wherein the data comparison circuit 405 compares the result of discrimination obtained in the discrimination circuit 404 with an expected value. In the event there is a large discrepancy between the result of discrimination and the expected value, the comparison circuit 405 supplies a control signal to the signal shape compensating circuit 14a for activating the same for signal waveform compensation. Thereby, the sample-and-hold circuit 402, the equalizer 403, the trivalent value discriminating circuit 404 and the data comparison circuit 405 constitute an asymmetry detection circuit 401.

In the construction of FIG. 13, it is also possible to control the polarity control unit 103 and the amplifier 104 also by the output of the asymmetry detection circuit 401.

In the description heretofore, it has been assumed that the magnetic sensor 22 used in the magnetic head is a spin-valve magnetic sensor. However, the present invention is not limited to such a magnetic sensor but is applicable also to the case a TMR sensor is used. Further, the present invention is effective for using in combination with a high-sensitivity magnetic head having a pinned layer in which the direction of magnetization is fixed by establishing a magnetic coupling with another magnetic body such as an antiferromagnetic material.

Further, the present invention is not limited to the embodiments described heretofore, but various variations and modifications may be made without departing from the scope of the invention.

What is claimed is:

1. A signal processing circuit for processing an output signal of a magnetic sensor having a pinned layer, comprising:
    a detection unit supplied with said output signal of said magnetic sensor, said detection unit detecting a reversal of a magnetization of said pinned layer from a first predetermined direction to a second direction away from said first predetermined direction; and
    a signal control unit supplied with said output signal of said magnetic sensor, said signal control unit producing an output signal corresponding to said output signal of said magnetic sensor in response to a result of detection of said detection unit, such that said output signal of said signal control unit has a maximum value when said magnetic sensor detects a first magnetic field parallel to said first predetermined direction and a minimum value when said magnetic sensor detects a second magnetic field anti-parallel to said first predetermined direction.

2. A signal processing circuit as claimed in claim 1, wherein said magnetic sensor is a spin-valve magnetic sensor.

3. A signal processing circuit as claimed in claim 1, wherein said detection unit is supplied with said output signal of said magnetic sensor via a pair of lines, said detection unit detecting said reversal of magnetization of said pinned layer by subtracting a voltage appearing on one of said pair of lines from a voltage appearing on the other of said pair of lines.

4. A signal processing circuit as claimed in claim 3, wherein said detection unit comprises a differential amplifier detecting a voltage appearing across said pair of lines, an integrating circuit for integrating an output of said differential amplifier, and a comparator supplied with an output of said integrating circuit, said comparator carrying out a comparison between said output of said integrating circuit and a reference voltage and producing an output signal indicative of a result of said comparison, said comparator supplying said output indicative of said result to said signal control unit.

5. A signal processing circuit as claimed in claim 1, wherein said detection unit detects a reversal of magnetization of said pinned layer by detecting a level of said output signal of said magnetic sensor.

6. A signal processing circuit as claimed in claim 1, wherein said detection unit comprises an automatic gain control circuit supplied with said output signal of said magnetic sensor, said automatic gain control circuit detecting a level of said output signal of said magnetic sensor, and a comparator supplied with an output of said automatic gain control circuit, said comparator carrying out a comparison between said output of said automatic gain control circuit and a reference voltage, said comparator supplying said output signal indicative of said result to said signal control unit.

7. A signal processing circuit as claimed in claim 6, wherein said automatic gain control circuit detects said output of said magnetic sensor after said output of said magnetic sensor has been processed by said polarity control unit.

8. A signal processing circuit as claimed in claim 1, wherein said signal control unit includes a cross-connecting switch supplied with said output signal from said magnetic sensor along a pair of lines, said cross-connecting switch being activated in response to an output of said detection unit indicative of said result of detection.

9. A signal processing circuit as claimed in claim 1, further comprising an amplifier supplied with an output signal of said signal control unit, said amplifier amplifying said output signal of said signal control unit with an amplification factor, said amplifier being further supplied with an output signal of said detection unit such that said amplification factor is controlled by said output signal of said detection unit.

10. A magnetic information storage device, comprising:
    a spindle motor;
    a magnetic disk rotated by said spindle motor;
    a magnetic head scanning over a surface of said magnetic disk generally in a radial direction thereof, said magnetic head including a magnetic sensor having a pinned layer;
    a swing arm pivoted about a swing axle, said swing arm carrying said magnetic head at a tip end thereof;
    an actuator actuating said swing arm to cause a swing motion about said swing axle; and
    a signal processing circuit processing an output signal of said magnetic sensor,
    said signal processing circuit comprising:
        a detection unit supplied with an output signal of said magnetic sensor, said detection unit detecting a reversal of a magnetization of said pinned layer from a first predetermined direction to a second direction away from said first predetermined direction; and
        a signal control unit supplied with said output signal of said magnetic sensor, said signal control unit producing an output signal corresponding to said output signal of said magnetic sensor in response to a result of detection of said detection unit, such that said output signal of said signal control unit has a maximum value when said magnetic sensor detects a first magnetic field parallel to said first predetermined direction and a minimum value when said magnetic sensor detects a second magnetic field anti-parallel to said first predetermined direction.

11. A magnetic information storage device as claimed in claim 10, wherein said magnetic sensor is a spin-valve magnetic sensor.

12. A magnetic information storage device as claimed in claim 10, wherein said detection unit is supplied with said output signal of said magnetic sensor via a pair of lines, said detection unit detecting said reversal of magnetization of said pinned layer by subtracting a voltage appearing on one of said pair of lines from a voltage appearing on the other of said pair of lines.

13. A magnetic information storage device as claimed in claim 12, wherein said detection unit comprises a differential amplifier detecting a voltage appearing across said pair of lines, an integrating circuit for integrating an output of said differential amplifier, and a comparator supplied with an output of said integrating circuit, said comparator carrying out a comparison between said output of said integrating circuit and a reference voltage and producing an output signal indicative of a result of said comparison, said comparator supplying said output indicative of said result to said signal control unit.

14. A magnetic information storage device as claimed in claim 10, wherein said detection unit detects a reversal of magnetization of said pinned layer by detecting a level of said output signal of said magnetic sensor.

15. A magnetic information storage device as claimed in claim 10, wherein said detection unit comprises an automatic gain control circuit supplied with said output signal of said magnetic sensor, said automatic gain control circuit detecting a level of said output signal of said magnetic sensor, and a comparator supplied with an output of said automatic gain control circuit, said comparator carrying out a comparison between said output of said automatic gain control circuit and a reference voltage, said comparator supplying said output signal indicative of said result to said signal control unit.

16. A magnetic information storage device as claimed in claim 15, wherein said automatic gain control circuit detects said output of said magnetic sensor after said output of said magnetic sensor has been processed by said polarity control unit.

17. A magnetic information storage device as claimed in claim 10, wherein said signal control unit includes a cross-connecting switch supplied with said output signal from said magnetic sensor along a pair of lines, said cross-connecting switch being activated in response to an output of said detection unit indicative of said result of detection.

18. A magnetic information storage device as claimed in claim 10, further comprising an amplifier supplied with an output signal of said signal control unit, said amplifier amplifying said output signal of said signal control unit with an amplification factor, said amplifier being further supplied with an output signal of said detection unit such that said amplification factor is controlled by said output signal of said detection unit.

* * * * *